Sept. 20, 1949.  S. S. POKORNY  2,482,365
LOADER FOR TRACTORS
Filed Oct. 10, 1946  2 Sheets-Sheet 1

Inventor
S. S. Pokorny
By Arthur H. Sturges.
Attorney

Sept. 20, 1949.  S. S. POKORNY  2,482,365
LOADER FOR TRACTORS
Filed Oct. 10, 1946  2 Sheets-Sheet 2
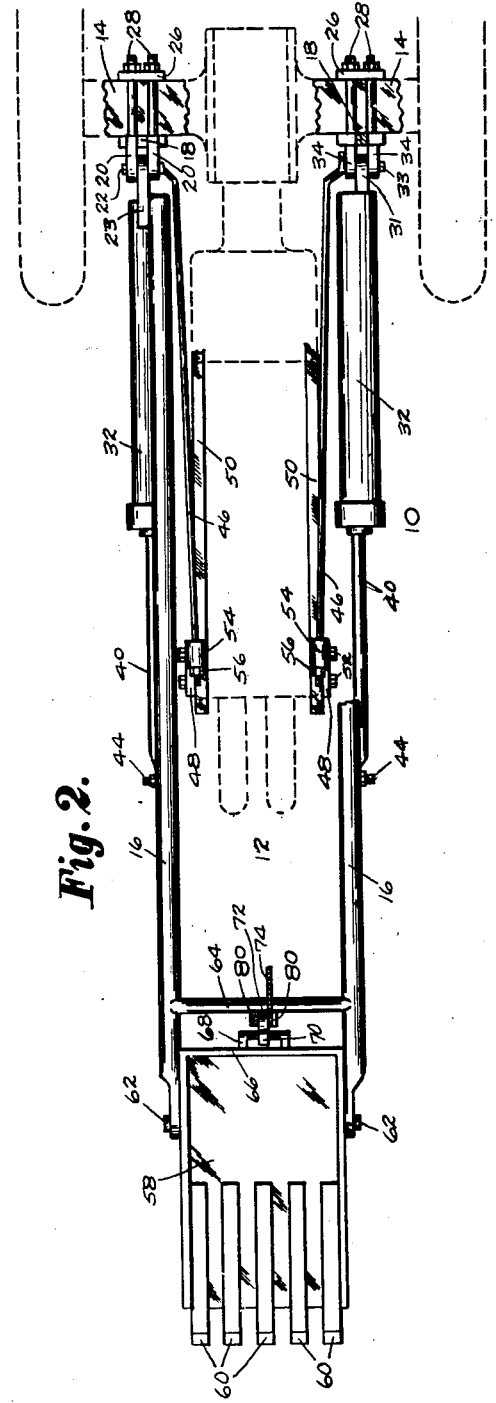
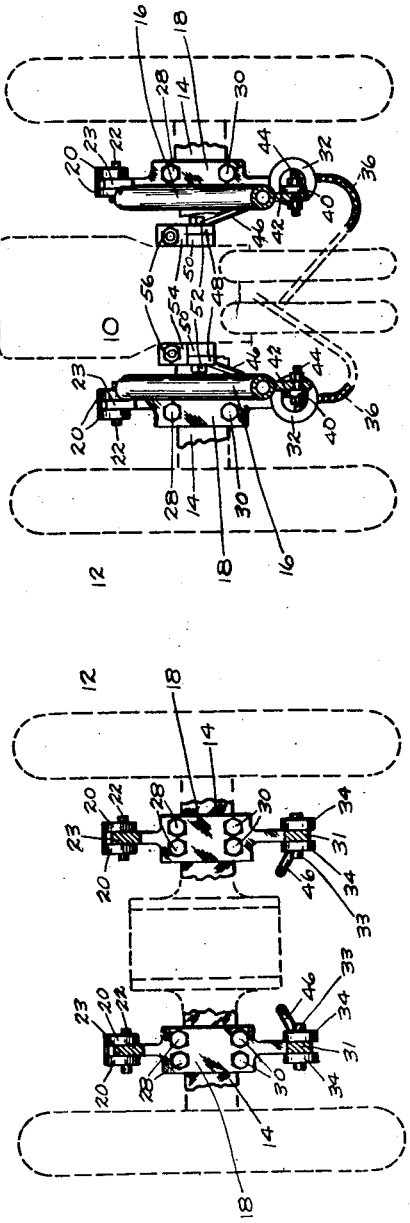
Inventor
S. S. Pokorny
By *Arthur H. Sturges*
Attorney Patented Sept. 20, 1949

2,482,365

UNITED STATES PATENT OFFICE 2,482,365

LOADER FOR TRACTORS

Stephen S. Pokorny, Fort Dodge, Iowa

Application October 10, 1946, Serial No. 702,506

1 Claim. (Cl. 214—140)

1

This invention relates to elevating and lowering means for farm implements. More particularly, it is an object of the invention to provide as an attachment for a tractor, a hoist which may be used for elevating or lowering an implement such as, for example, a sweep rake or scoop.

Loading mechanisms of the prior art for attachment to tractors and the like have usually been of a type having mechanism positioned high above the tractor itself so that it has been difficult to drive the tractor, with mechanism attached, under lower barn doorways and the like. Although some attempts have been made to construct loading mechanism which provide for low head-room yet these have had a further disadvantage in that they sacrificed ability to raise the scoop or rake to any considerable height and especially to heights at all approaching a vertical positioning of the main scoop-booms.

It is therefore an object of this invention to provide a material lifting mechanism for attachment to a tractor having both the advantages of low head-room and high elevating characteristics.

Another object of the invention resides in the provision of a mechanism as described employing hydraulic jacks which are more efficient, simpler and less likely to fail than winches, cables and other power lifting mechanisms.

A still further object of the invention resides in the provision of a lifting mechanism for attachment to a tractor having the scoop lifting arms thereof attached adjacent the rearward end of the tractor, having the hydraulic jacks thereof pivotally attached between the rearward end of the tractor and the lifting arms so that it is possible to raise and lower the lifting arms from a position in which the scoop is resting on the ground upwardly into a position approaching the vertical, in which the hydraulic jacks are approximately parallel to the lifting arms.

Still further objects of the invention reside in the provision of a novel supporting plate for pivotally attaching the lifting arms and hydraulic jacks to the rear axle housing of a tractor, and in the provision of a bracing rod rigidly attached to the forward end of the tractor and to the lower end of said supporting plate.

A still further object of the invention resides in the provision of an apparatus for the purposes described, having a lesser number of parts and adapted to be more inexpensively manufactured than heretofore.

Other and still further objects and advantages of the invention will become apparent from the following description of a preferred embodiment thereof.

In the drawings:

Figure 2 is a top plan view of the mechanism shown in Figure 1, a part of one of the lifting arms thereof being broken away to more clearly depict the hydraulic jack positioned therebeneath, certain parts of the rear axle housing of the tractor being shown in full;

Figure 3 is a view in section taken along the line 3—3 of Figure 1; and

Figure 4 is a view in section taken along the line 4—4 of Figure 1.

Figure 1:
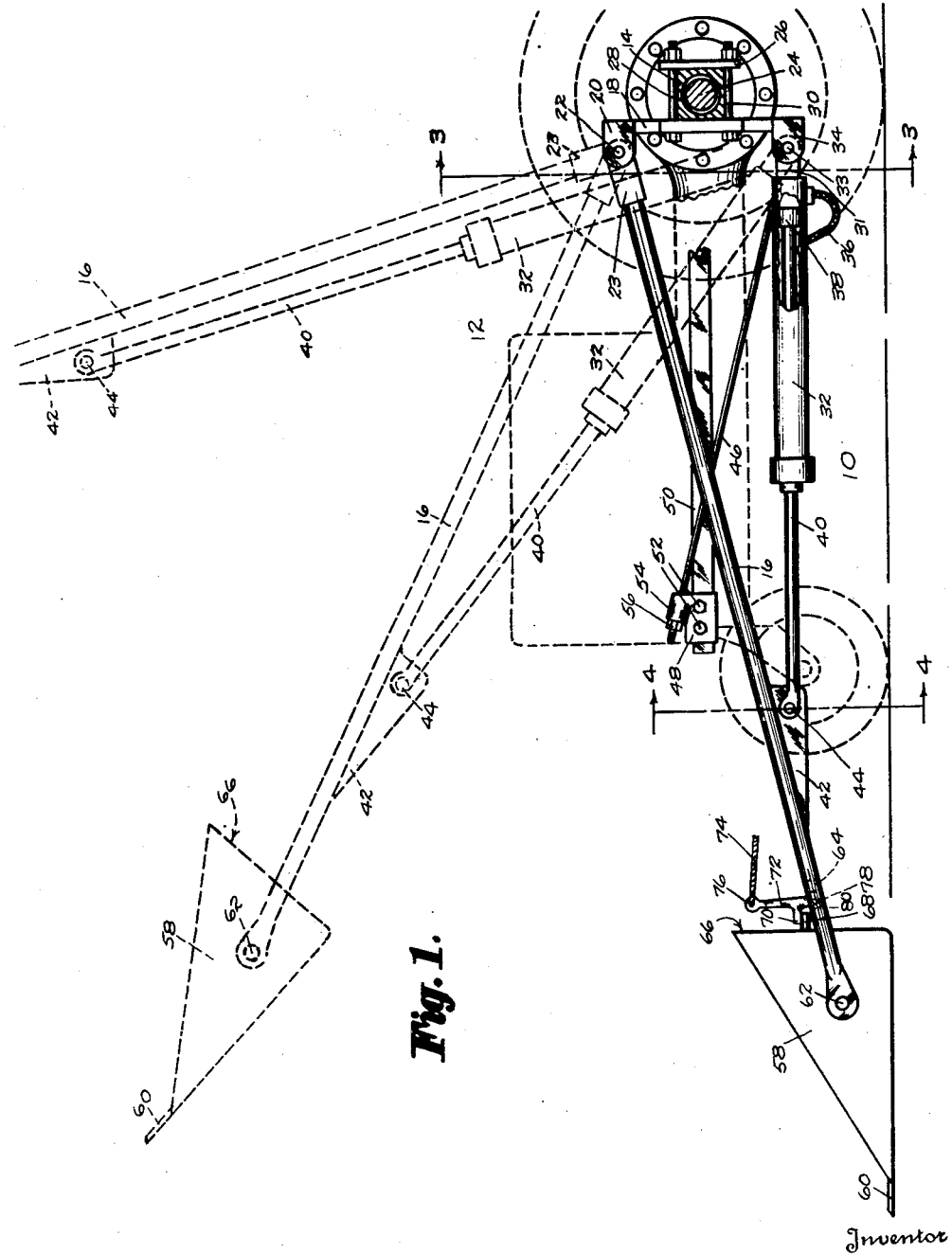
Figure 1 is a side elevation of the material loading mechanism of this invention shown as attached to a tractor, the tractor as well as the loading mechanism in its upward positions both being shown in dotted lines, certain parts of the framework as well as a part of the rear axle housing of the tractor being shown in full.

The loading mechanism of this invention is generally indicated at 10 and is preferably intended for attachment to a tractor generally indicated at 12 in dotted lines.

The tractor 12 is preferably of a type provided with a square rear axle housing 14 and further provided with an oil pump unit adapted to operate fluid pressure operated attachments and having suitable valve means, not shown, for controlling the operation of such attachments.

The loading mechanism 10 includes a pair of lifting arms 16 arranged at opposite sides of the tractor 12. The rearward ends of the arms 16 are pivotally attached adjacent the rearward end of the tractor 12 and preferably by means of a pair of supporting plates 18. The supporting plates 18 are preferably in a vertically disposed position and are preferably provided each with a pair of horizontally extending ears 20 at the upper ends thereof to which the flattened rearward ends 23 of the lifting arms 16 are pivotally attached by means of a pair of pins 22. The supporting plates 18 may be secured in any suitable manner to the rear axle housing of the tractor 12, however, when the tractor 12 is one of the type having a square rear axle housing 14 surrounding its rear axle 24, then the supporting plate 18 is positioned flush against the forward side of the rear axle housing 14 and a backing plate 26 is placed against the rearward side of the rear axle housing. Each backing plate is secured to its corresponding supporting plate by means of a pair of bolts 28 which are disposed above the rear axle housing and the second pair of bolts 30 which are disposed below the rear axle housing, the said bolts being positioned in apertures in the supporting plate 18 and the backing plate 26.

Means are provided for raising the lifting arms 16 and such means includes a pair of hydraulic jacks 32 having their cylinders pivotally attached to the opposite sides of the rearward end of the tractor 12. Preferably, each of the cylinders 32 are provided with a flattened tab 31 on the rearward end thereof which are attached by means of a pin 33 to a pair of horizontally extending ears 34 which are in turn attached to the lower end of the corresponding supporting plate 18, the supporting plate 18 being of such a length as to extend both above and below the rear axle 24 of the tractor 12. The jack cylinders 32 are attached to a source of hydraulic pressure such as an oil pump unit, not shown, the interconnection between the jack cylinders 32 and the oil pump unit being made by a pair of flexible conduits 36.

The jacks 32 are each provided with pistons 38 and piston rods 40, the outward ends of the piston rods 40 being each pivotally attached to the lower side and adjacent the front end of the lifting arms 16, the attachment being preferably made by means of a pair of triangular connection plates 42 which are suitably attached to the under side of the lifting arms 16, the piston rods 40 being pivotally secured to the connecting plates 42 by means of a pair of pins 44. Preferably, the jacks 32 are of such length when in a collapsed position that the piston rods 40 thereof will extend well toward the forward end of the lifting arms 16.

In order to reinforce the attachment of the supporting plate 18 to the rear axle housing 14, a brace rod 46 is employed, being rigidly attached to a pair of trunnion plates 48 which are disposed at either side of the forward end of the tractor 12, the trunnion plates being secured to the frame 50 of the tractor by means of a pair of bolts 52. The brace rod 46 is rigidly secured in an apertured barrel portion 54 of the trunnion plates 48 by means of a nut 56 and the rearward ends of the brace rods 46 are attached to the lower end of the supporting plate 18 in any suitable manner.

The distance between the pivotal mountings of the rearward end of the lifting arms 16 and the rearward ends of the hydraulic jacks 32 is preferably such as to form a triangle between the lifting arms 16 and their corresponding hydraulic jacks and supporting plates, the angle formed between the supporting plates 18 and their corresponding hydraulic jacks 32 is preferably an angle approaching 90 degrees or greater at times when the lifting arms 16 are in their lowest position. At times when the lifting arms 16 are in raised position, the angle formed between the supporting plates 18 and the corresponding hydraulic jacks 32 becomes more and more acute until at times when the lifting arms 16 are in their uppermost position, preferably the hydraulic jacks 32 will be substantially parallel with the lifting arms 16.

A scoop 58 having tines 60 is pivotally mounted by means of a pair of bolts 62 disposed at either side thereof to the outer ends of the lifting arms 16.

Means are provided for controlling the position of the scoop with respect to the lifting arms 16 and such means includes a cross bar 64 rigidly attached to each of the lifting arms 16 closely adjacent the rearward wall 66 of the scoop 58. The rearward wall 66 is provided with a lock 68 secured thereto of U-shape in top plan view and a latch 70 adapted to be positionable within the U-shaped lock 68, the latch 70 being so attached to a lever 72 that at times when the lever 72 is in a forward position, the latch 70 will engage the lock 68, preventing dumping movements of the scoop 58 and at such times as the lever 72 is in a rearward position, the latch 70 will be freed from the lock 68, permitting a dumping motion of the scoop 58, since at times when the scoop 58 is loaded, its center of gravity will be normally forwardly of the pivotal connection formed by the bolt 68. The operator of the tractor may cause the rearward motion of the lever 72 by pulling upon a line 74 attached to an eyelet 76 in the upper end of the lever 72.

The lower end of the lever 72 is pivotally attached by means of a pin 78 between a pair of forwardly extending ears 80, the said ears being attached to the forward side of the cross piece 64.

In operation, it will be seen that the loading mechanism of this invention will not reduce the headroom of the tractor 12 and that the tractor, with the present invention attached thereto, will be free to pass under low entry ways such as barn doors and the like. It will be further seen that the advantages of low head-room are attained without sacrifice of operating qualities since the new loading mechanism is so constructed that the scoop thereof may be raised from an on-the-ground position upwardly into a position in which the lifting arms 16 are approaching the vertical.

From the foregoing description, it is thought to be obvious that a loading mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

In a loading mechanism for attachment to a tractor of the type having a source of hydraulic pressure: a vertical support secured to the rear axle housing of said tractor; a lifting arm disposed at one side of said tractor, the rearward end of said arm being pivotally attached to said support, the forward end of said lifting arm extending forwardly of the tractor; a hydraulic jack disposed below said lifting arm, said jack being pivotally secured at one of its ends to said support directly beneath the pivotal attachment between said arm and said support, the other end of said jack being pivotally secured to said lifting arm at a point between the ends of the latter; a conduit for interconnecting said hydraulic cylinder and said source of hydraulic pressure; and a tie rod attached to the lower end of said support and to the forward end of said tractor to relieve twisting strain on said tractor between said rear axle housing and the forward portions of said tractor.

STEPHEN S. POKORNY.

REFERENCES CITED

The following references are of record in the file of this patent:

UNITED STATES PATENTS

| Number | Name | Date |
|---|---|---|
| 2,001,803 | Stephens | May 21, 1935 |
| 2,295,917 | Schwan | Sept. 15, 1942 |
| 2,363,986 | Mott | Nov. 28, 1944 |
| 2,417,021 | Simmonds | Mar. 4, 1947 |
| 2,419,493 | Hoff | Apr. 22, 1947 |